(12) United States Patent
Kiely

(10) Patent No.: US 8,476,541 B1
(45) Date of Patent: Jul. 2, 2013

(54) JUNCTION/OUTLET BOX LOCKING INSERT, JUNCTION/OUTLET BOX SYSTEM AND METHOD

(76) Inventor: Kenneth Kiely, Milford, CT (US)

( * ) Notice: Subject to any disclaimer, the term of this patent is extended or adjusted under 35 U.S.C. 154(b) by 50 days.

(21) Appl. No.: 13/293,479

(22) Filed: Nov. 10, 2011

Related U.S. Application Data

(60) Provisional application No. 61/465,173, filed on Mar. 15, 2011.

(51) Int. Cl.
*H02G 3/18* (2006.01)
(52) U.S. Cl.
USPC ........... 174/656; 174/659; 174/665; 174/666; 439/557
(58) Field of Classification Search
USPC .................. 174/659, 665, 666, 656; 439/557, 439/552; 248/56; 285/194
See application file for complete search history.

(56) References Cited

U.S. PATENT DOCUMENTS

| | | | |
|---|---|---|---|
| 1,131,399 A | 3/1915 | McGinley | |
| 4,103,101 A | 7/1978 | Maier | |
| 4,845,312 A | 7/1989 | Lee | |
| 5,266,050 A | 11/1993 | O'Neil et al. | |
| 5,728,971 A | 3/1998 | Nash | |
| 6,444,907 B1 | 9/2002 | Kiely | |
| 6,521,833 B1 | 2/2003 | DeFreitas | |
| 6,604,400 B1 * | 8/2003 | Gretz | 72/334 |
| 7,304,251 B1 * | 12/2007 | Gretz et al. | 174/655 |
| 7,703,813 B1 | 4/2010 | Kiely | |
| 7,854,627 B1 | 12/2010 | Gretz | |
| 7,897,871 B1 | 3/2011 | Shemtov | |
| 8,143,535 B2 * | 3/2012 | Auray et al. | 174/666 |

OTHER PUBLICATIONS

Thomas & Betts catalog No. 4-SDW-MXN.
Bridgeport Fittings Inc. Catalog ID: 230-DC2.
Bridgeport Fittings Inc. Catalog ID: 570-DC2.

* cited by examiner

*Primary Examiner* — Dhirubhai R Patel
(74) *Attorney, Agent, or Firm* — McGlew and Tuttle, P.C.

(57) ABSTRACT

A junction/outlet box locking insert, system and method including an insert body with an outer insert body surface and an inner axially extending pass through region having an open end and an end with an electrical cable/conduit stop with a central electrical conductor pass through opening. A retainer flange is connected with the insert body at an axial end thereof. An insert stop device cooperates with the retainer flange for fixing a position of the insert body relative to a junction/outlet box. A locking finger arrangement is connected to the insert body and includes a locking finger extending radially inwardly of the outer insert body surface. The locking finger is self-actuating for engaging a conduit or a metallic sheath of an electrical cable upon the conduit or a metallic sheath being inserted into the pass through region up to the electrical cable/conduit stop.

20 Claims, 5 Drawing Sheets

JUNCTION/OUTLET BOX LOCKING INSERT, JUNCTION/OUTLET BOX SYSTEM AND METHOD

CROSS REFERENCE TO RELATED APPLICATIONS

This application claims the benefit of priority under 35 U.S.C. §120 of U.S. Provisional Application Ser. No. 61/465,173 filed Mar. 15, 2011, the entire contents of which are incorporated herein by reference.

FIELD OF THE INVENTION

The invention relates to junction/outlet box fastenerless locking inserts and electrical and fastenerless junction box system for securing electrical cable and/or conduit into an electrical junction box as well as to a method for securing electrical cable and/or conduit into an electrical junction box.

BACKGROUND OF THE INVENTION

Devices have been used previously to secure electrical cable/conduit to an electrical junction box. One or more connectors must be provided for terminating the conduit or the various types and sizes of cable in accordance with the National Electrical Code (NEC).

The devices of Bridgeport Fittings catalog numbers 570-DC2 and 230-DC2 have a flexible flange built into an aperture in the junction box, or have an arrangement on a separate cable/conduit end connector that is then attached by a threaded end and nut.

U.S. Pat. No. 7,854,627 to Gretz discloses an electrical fitting with internal cable retainer. The electrical fitting has a trailing end with an arrangement for securing electrical cables thereto. The cable retainer includes a tubular body constructed of spring steel. A single cable retaining tang extends inwardly from a flat portion of the tubular body. The cable retainer can be connected to an junction/outlet box. The cable is retained at a location outside of the outlet box and the retainer is then connected to the junction/outlet box. This involves multiple steps in providing the connection and presents problems with regard to redoing the connection.

U.S. Pat. No. 7,703,813 to Kiely discloses a fitting connector or snap-in locking ring connector that connects in an aperture on the junction (outlet) box. The cable is retained at a location outside of the outlet box and the retainer is then connected to the junction/outlet box. Extra labor and material expense is involved in attaching an extra piece to a cable/conduit and then to the junction box.

Thomas & Betts catalog number 4-SDW-MXN shows a mechanism previously used that provides a junction box with internal clamping means. This device and others are limited to securing that same size and the same types of cable thereby requiring multiple junction boxes. U.S. Pat. No. 6,521,833 to DeFreites provides a device for use with corrugated plastic conduit. U.S. Pat. No. 5,728,971 to Nash requires a mounting locking mechanism outside of the junction/outlet box that is inserted into a slotted hole rather than the industry standard round hole. U.S. Pat. No. 4,845,312 to Lee is for use with threaded rigid conduit. U.S. Pat. No. 4,103,101 to Maier requires a special connector and a box combination. U.S. Pat. No. 1,131,399 to McGinley also requires special connector and box combination.

Difficulties with such attachment devices have occurred due to improper tightening of threaded nut or failure to fully engage the snap-in locking ring, both situations could result in improper bonding and securing of the cable/conduit to the junction box as required by the NEC.

SUMMARY OF THE INVENTION

This invention relates to an improved junction/outlet box locking insert as well as a system and method for securing an electrical cable and/or a conduit into an electrical junction or junction/outlet box. The electrical junction or junction/outlet box provides one or more steadfast locking inserts capable of terminating metal sheath cables or conduits of various types and sizes of cable in accordance with the National Electrical Code (NEC).

According to the invention, a junction/outlet box locking insert is provided with an insert body with an outer insert body surface and an inner axially extending pass through region having an open end and an end with an electrical cable/conduit stop with a central electrical conductor pass through opening. A retainer flange is connected with the insert body at an axial end thereof. An insert stop device cooperates with the retainer flange for fixing the insert body to a junction/outlet box. A locking finger arrangement is connected to the insert body and includes a locking finger extending radially inwardly of the outer insert body surface. The locking finger is self-actuating for engaging a conduit or a metallic sheath of an electrical cable upon the conduit or the metallic sheath being inserted into the pass through region up to the electrical cable/conduit stop. The retainer flange and the insert stop device position the insert body relative to the junction/outlet box such that the locking finger engages the conduit or the metallic sheath within the junction/outlet box.

According to another aspect of the invention a junction/outlet box system is provided comprising a junction/outlet box with knockout openings having an opening dimension and a junction/outlet box locking insert according to the invention.

According to another aspect of the invention a method is provided including providing an electrical box having an opening, providing an electrical cable with an outer metal sheath and/or conduit with a metal tube and providing a junction/outlet box locking insert according to the invention. The insert body of the junction/outlet box locking insert is inserted into the opening of the electrical box such that a retainer flange contacts a surrounding wall of the opening. The insert body is fixed to the electrical box based on the insert stop device cooperating with the retainer flange to retain the locking insert to the electrical box with a portion of the sidewall of the electrical box held between the insert stop and the retainer flange. The electrical cable and/or conduit is inserted through the pass through region open end and into the pass through region until the outer metal sheath or metal tube reaches the electrical cable/conduit stop, the locking finger being self-actuating and engaging the conduit or the metallic sheath upon the conduit or the metallic sheath being inserted into the pass through region up to the electrical cable/conduit stop, the retainer flange and the insert stop device positioning the insert body relative to the electrical box such that the locking finger engages the conduit or the metallic sheath within the electrical box.

The insert connection with the junction or junction/outlet box advantageously positions the insert body relative to the junction/outlet box such that the locking finger engages the conduit or the metallic sheath within the junction/outlet box. The invention has the attribute of being capable of fastening the cable or conduit and providing visual cable/conduit fastening inspection after the drywall or sheetrock wall structure is added.

The self-actuating nature of the locking finger of the locking finger arrangement presents a significant advantage of lowering the overall labor involved in cable and/or conduit to junction or junction/outlet box connections. In particular, the tool-less and fastenerless (self-actuating) nature of the of the locking finger to cable and/or conduit connection avoids the complicated installation procedures required with prior devices and allows for a quick and dependable bonding of the cable and/or conduit to the junction or junction/outlet box. The locking finger provides a self-securing or self-actuating bonding of the cable or conduit and the insert body and thereby provides a self-securing or self-actuating bonding of the cable or conduit with the electrical junction or junction/outlet box.

An embodiment of the invention provides self-securing spring steel inserts that have a connection feature for connection to a junction or junction/outlet box structure wall and that are sized to slidably fit within the junction or junction/outlet box opening. The insert comprises a housing with a retainer flange and a flexible insert stop spaced axially from the retainer flange to prevent the insert from passing through the junction or junction/outlet box wall opening. This construction eliminates the necessity of attaching cable and/or conduit to the junction or junction/outlet box using traditional locknut or snap-in style electrical fitting connectors or a junction or junction/outlet box suitable for use with only limited cable type and range of sizes. The invention has the added advantage of providing a locking insert that is capable of being used in an industry standard junction or junction/outlet box knockout hole which, when the knockout piece is removed, provides a knockout hole capable of accepting traditional connectors.

The invention provides a method for connecting electrical metallic sheath cable and/or metal conduit into a junction or junction/outlet box without the use of a separate fitting and includes the steps of attaching a piece of cable or conduit to the locking insert. The locking insert is mounted to a junction or junction/outlet box housing, in one motion for immobilizing the cable or conduit. The locking insert is accessible from the inside of the junction or junction/outlet box for ease in terminating a cable/conduit without the use of tools. This method also provides visual cable/conduit fastening inspection when a junction or junction/outlet box with locking insert is installed behind a finished wall. This method overcomes the problems with the current practice of removing a portion of finished wall for connecting or inspecting cable or conduit termination, which is costly and time consuming.

The invention provides a generally cylindrical self-securing insert body that operates by fitting into one of a plurality of knockout holes on the junction or junction/outlet box. The self-securing insert is longer than the knockout hole wall thickness and is sized to slidably fit within the industry standard junction or junction/outlet box knockout opening and is provided with an end stop. An outer stop on one end of the insert prevents the insert from sliding further into the knockout hole. The inner hinged locking fingers are smaller in dimension than the cable diameter and will flex outward to permit raised convolutions of armored (AC), metal-clad (MC), and metal-clad interlocked armored (MCI-A) cable to pass through to the insulator end stop and then spring inward between the convolutions of the cable and secure the cable with constant pressure to ensure continuous fixation with the electrical junction or junction/outlet box (the enclosure) and protect the cable against withdrawal by a pulling force. Similarly, the hinged locking finger creates a smaller passageway for conduit tubing and is utilized to secure tubing such as Electrical Metallic Tubing (EMT) and rigid conduits. In this case, the locking finger flexes upward as the tubing passes through to the insulator end stop and constant pressure is maintained to ensure a continuous fixation of the tubing to the electrical junction or junction/outlet box (the enclosure) and to protect against withdrawal by a pulling force.

The locking insert may advantageously be made of a tough resilient spring material to enable the integrally formed locking finger to flex for insertion of the cable/conduit and yet strong enough for the integrally formed locking finger to retain the electrical cable/conduit upon a substantial pulling force being exerted on the electrical cable/conduit while maintaining continuous fixation of the cable/conduit to the electrical junction or junction/outlet box (the enclosure) as required by the National Electrical Code (NEC).

The locking insert can be used with a pre-existing electrical junction or junction/outlet box having an industry standard knockout opening. Such boxes often have a pop-out plate in their knockout hole to keep cement and other construction debris from passing into the box through those projections that are unused and unfilled by electrical conduit or connector. The locking insert of the invention is capable of being removed thus permitting a contractor the option of using the industry standard knockout hole for other applications.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
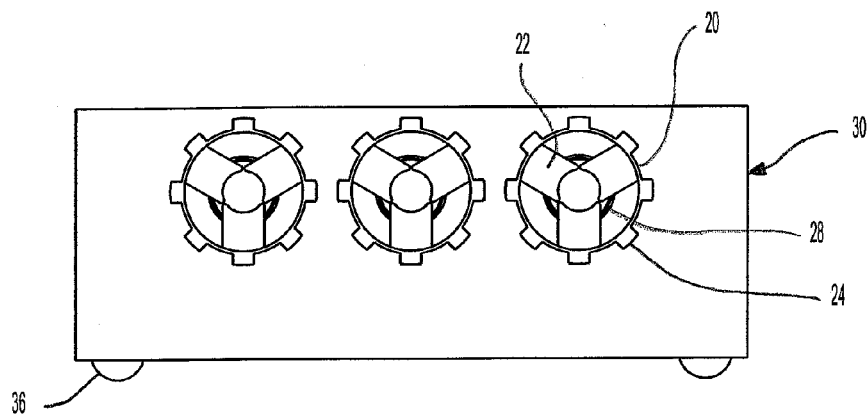
FIG. 1 is a top view of an junction/outlet box system with locking inserts according to a first embodiment of the invention with locking fingers suitable for cables such as armored (AC), metal-clad (MC), metal-clad interlocked armored (MCI-A), and flexible metal conduit (FMC)
Figure 2:
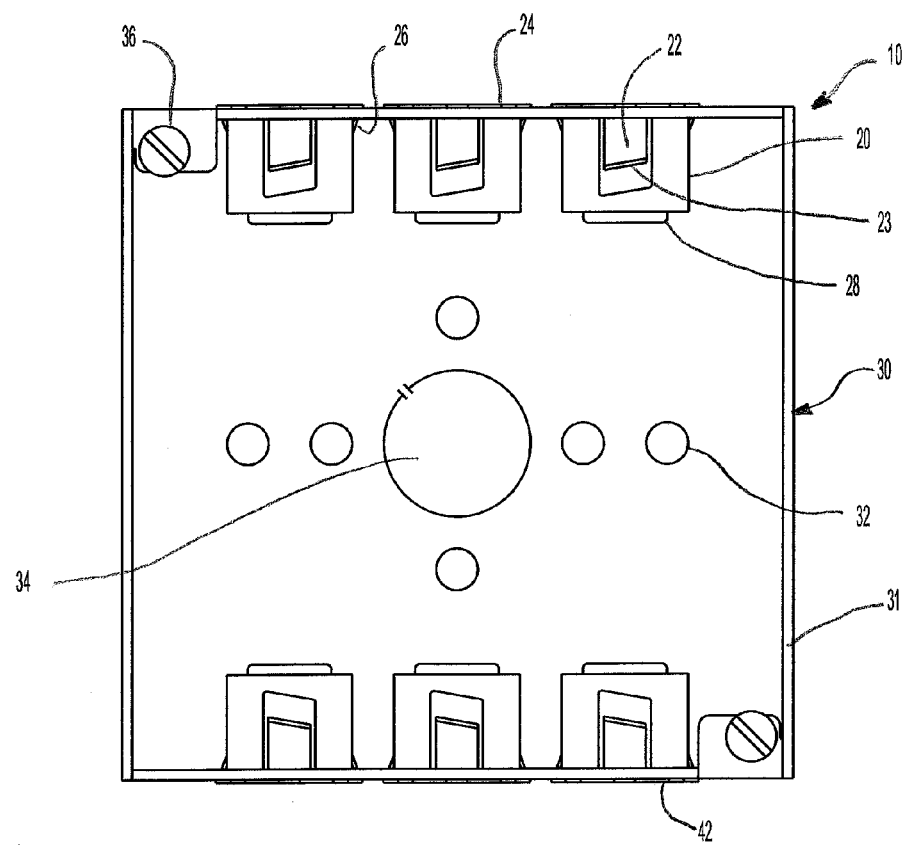
FIG. 2 is a front view of the junction/outlet box system of FIG. 1, showing a plurality of locking inserts projecting inside the junction or junction/outlet box and showing locking fingers capable of retaining cable and bonding requirements of the National Electrical Code within a region of the junction or junction/outlet box.

Referring to the drawings in particular, FIGS. 1 and 2 show a fastenerless electrical junction/outlet box system 10 with an electrical junction/outlet box 30 with self-securing locking inserts 20. The locking inserts 20 each comprise an insert body formed of spring steel with an integral retainer flange 24 at an open end 42. The locking inserts 20 each have an outer insert body surface with integral insert stops 26. The locking inserts 20 are prevented from passing through the junction or junction/outlet box outlet hole 34 or mounting hole 32 based on the retainer flange 24 having a diameter larger than the junction or junction/outlet box knockout hole 34. The insert stops 26 are flexible and in a relaxed state the insert stops present a diameter (dimension) that is greater than the diameter (dimension) of the junction or junction/outlet box outlet hole 34 or mounting hole 32. When locking insert 20 is passed through knockout hole 34 or mounting hole 32, the insert stops 26 flex inwardly to present a flexed state diameter that is the same as or smaller than the diameter (dimension) of the box hole 34 or mounting hole 32 for being inserted into the opening of the junction/outlet box. The flexed state continues until the insert stops 26 completely pass the box wall 31 and then spring outward to their original relaxed diameter. This configuration provides a bonding between the box 30 and the locking insert 20.

The locking inserts 20 have an inner axially extending electrical cable/conduit pass through region 62 having an opening at the open end 42 and having an end with an insulated electrical cable/conduit stop 28 with a central terminal pass through opening 38. The end stop 28 prevents the cable metallic sheath 72 from passing through the opening. The locking insert 20 has a body formed of spring steel which provides a locking finger arrangement 18 that includes integral locking fingers 22 that extend inwardly into the electrical cable/conduit pass through region 62. Each locking finger 22 is angled. Each locking finger 22 has a locking tab 23 that is at a further angle and is offset to match the cable convolution helix. The locking finger 22 has a rest state such that it will be in the path of the metallic armored sheath 72 of the cable as it is inserted through the opening at the open end 42. This provides a self-actuating (tool-less and fastenerless) locking finger to cable connection (bonding) as the cable sheath 72 is inserted into cable/conduit pass through region 62. After the cable sheath is inserted, the locking finger 22 will rest at the outer root surface (the region having a root diameter) between the cable convolutions applying steady pressure on the cable to retain the cable and to provide the necessary fixation (bonding) of the cable to the locking insert 20. The thickness of the junction or junction/outlet box wall 31, the diameter (dimension) of the mounting hole 32 and the knockout holes 34 are industry standard dimensions and locations as defined by National Electrical Manufacturers Association (NEMA). A cover screw 36 is provided for later use to attach a cover or device. The fastenerless junction/outlet box system 10 does not require removal of a finished wall for connecting or for inspecting the cable.

Figure 3:
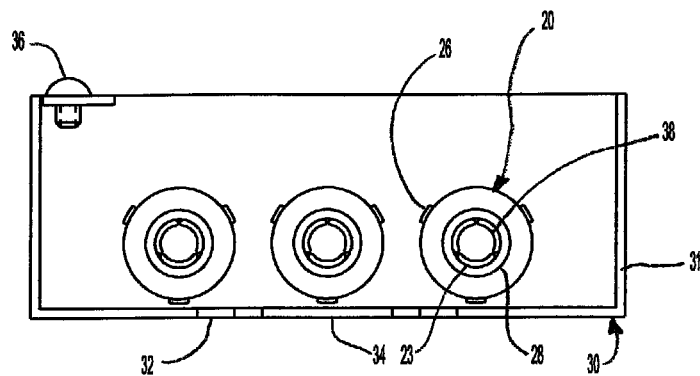
FIG. 3 is a sectional view showing the inside of the junction/outlet box facing the locking inserts including flexible insert stops that prevent removal of the associated locking insert.

Referring to FIG. 3 the insert stops 26 are shown securing the locking insert 20 to the junction or junction/outlet box 30. The insulator end stop 28 of the locking insert 20 acts as a stop as to the metallic armored sheath 72 of the cable. The opening 38 is large enough to permit passage of electrical conductors 70 but smaller than the metallic armored sheath 72 of the cable. This provides a stop function that reduces the possibility of electrical shock or fire by preventing the metallic sheath 72 from becoming energized by contact with live wiring. The end stop 28 is made of an insulator material. The locking insert 20 is positioned in the junction/outlet box 30 to allow ample volume for wiring of electrical devices. Locking tabs 23 are angled to extend radially inwardly and axially in a direction toward the insulator end stop 28 so as to be at an angle relative to a cable insertion direction 60 for allowing insertion of a sheathed cable into the electrical cable/conduit pass through region 62 in the cable insertion direction 60 and preventing removal of the sheathed cable from the cable pass through region 62 in a removal axial direction (opposite to cable insertion direction 60) based on the locking tab 23 engaging the metallic sheath 72 to act against removal. The size, angle and the design of the locking tabs 23 allows the acceptance of a variety of metallic sheath electrical cable trade sizes, types, and sheath materials such as steel or aluminum armored cable (AC), metal-clad cable (MC), metal-clad interlocked armor (MCI-A), and flexible metal conduit (FMC).

Figure 4:
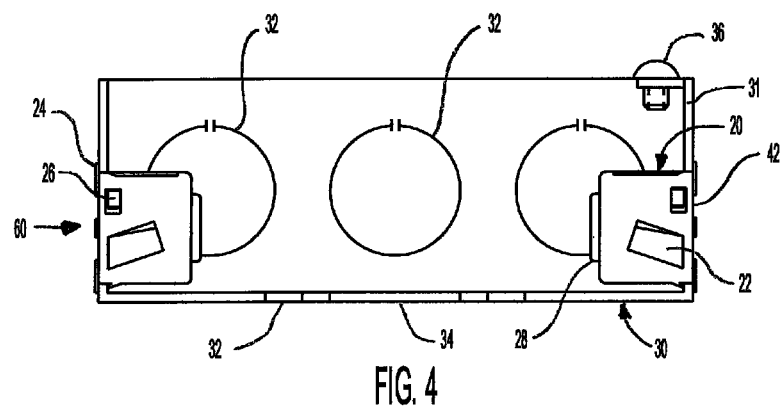
FIG. 4 is a sectional view illustrating the junction/outlet box and locking insert system.
Figure 5:
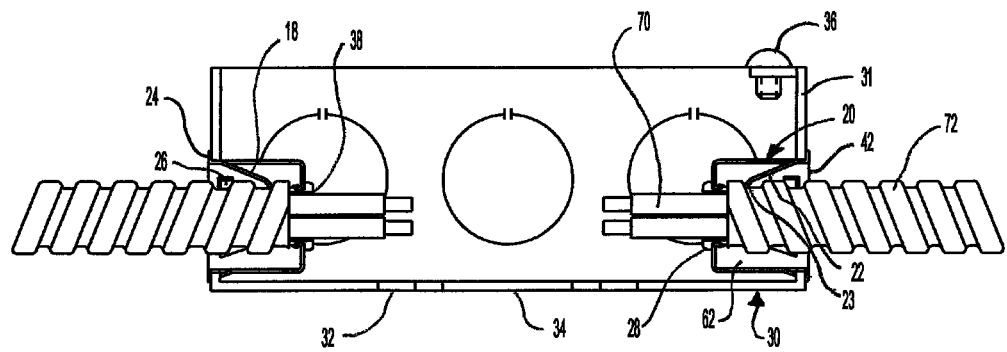
FIG. 5 is a sectional view depicting electrical cables installed into the junction/outlet box and locking insert system with the angled locking finger pressed upward by the cable and resting between cable convolutions.
Figure 6:
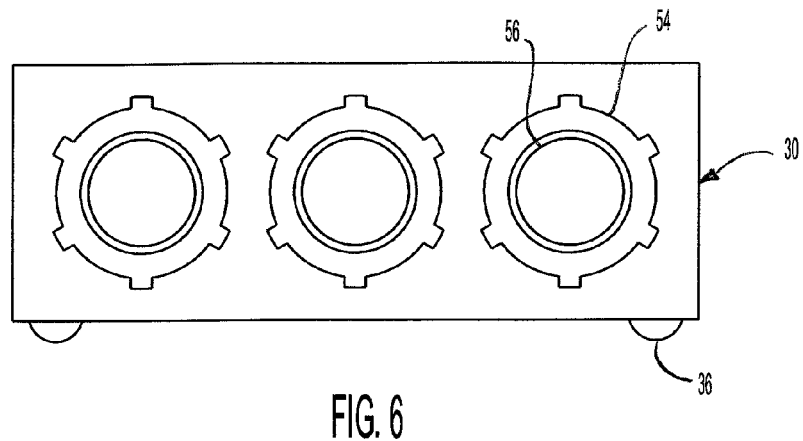
FIG. 6 is a side view of the junction/outlet box depicting locking inserts according to a second embodiment of the invention, with a locking finger suitable for a conduit such as an Electrical Metallic Tubing (EMT) or a rigid conduit.
Figure 7:
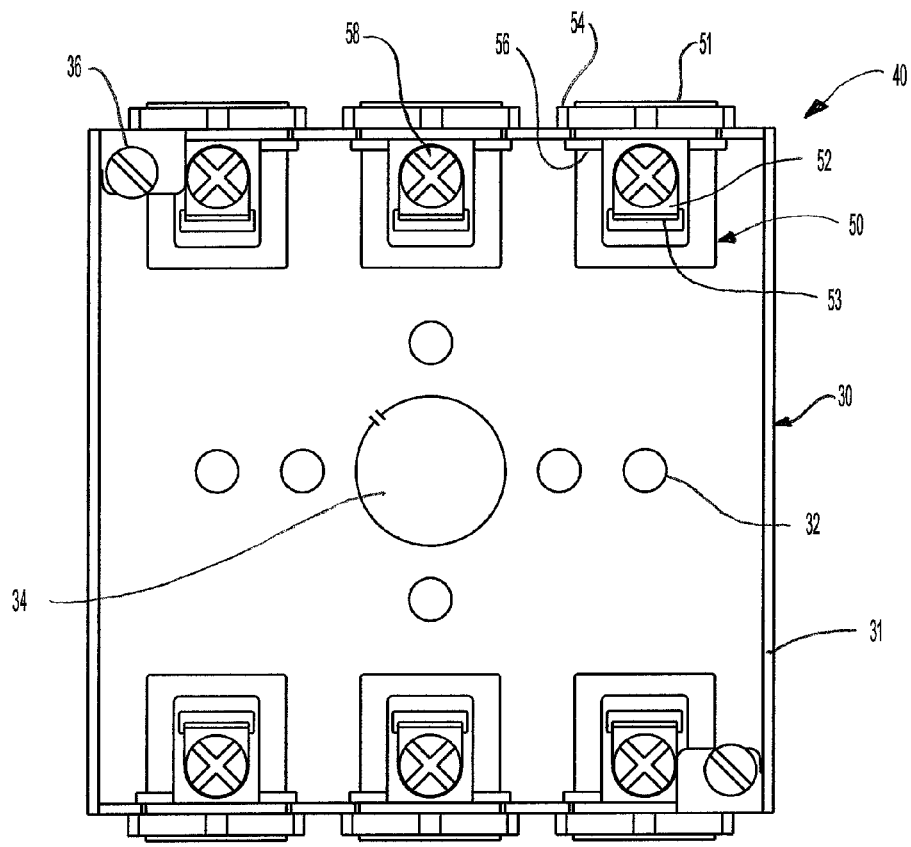
FIG. 7 is a front view of the junction/outlet box with a plurality of locking inserts according to the second embodiment of the invention.

Referring to FIGS. 4 and 5 the locking insert 20 is positioned in the junction/outlet box 30 to install electrical cable by use of the angled (hinged) locking fingers 22. The locking finger 22 will flex outward over the cable convolutions until the cable sheath 72 is pushed as far as the insulator end stop 28 causing the cable to stop. The locking fingers 22 are biased back to their rest state so that they settle between the cable convolutions when the locking fingers 22 spring inwardly (return toward a rest position). FIG. 5 depicts the metallic sheath 72 of an electrical cable installed in the fastenerless electrical junction/outlet box 10 through the locking insert 20 that is attached to the junction or junction/outlet box 30. The cable is correctly positioned in insert 20 by limiting insertion by use of the insulator end stop 28 sized to allow passage of electrical conductors 70 but stopping cable sheath 72 from passing through opening. Locking fingers 22 apply tension to the cable sheath and secure the cable with locking tabs 23 between cable convolutions.

A second embodiment of the invention is shown in FIGS. 6 through 12. The second embodiment provides a fastenerless electrical junction/outlet box system with a fastenerless electrical junction/outlet box 40. The fastenerless electrical junction/outlet box 40 has the same junction or junction/outlet box 30 but uses a self-securing insert 50. The self-securing insert 50 is prevented from passing through the junction or junction/outlet box outlet hole 34 by a retainer flange 55 that has a diameter that is larger than the diameter of the junction or junction/outlet box knockout hole or mounting hole 32. When the locking insert 50 is passed through the knockout hole 34 or mounting hole 32, the self-securing insert 50 stops against inner box wall 31 of junction or junction/outlet box and is secured to the junction or junction/outlet box by fastening of an insert external projection 51 with use of locking ring 54. This configuration fixes the locking insert 50 relative to the junction or junction/outlet box 30.

The self-securing insert 50 includes a locking finger arrangement 44 with a threaded locking finger retaining member 46 that is connected to the body of the self-securing insert 50 via a threaded retainer receiving opening 48. The locking finger retaining member 46 clamps an end of a locking finger 52 between a surface of the retaining member 46 and a surface of the body of the insert 50 adjacent to the opening 48 to fix the locking finger 52 relative to the body of the insert 50. This also sets the disposition of the locking finger 52, namely fixes the locking finger 52 such that it extends at about a 90 degree angle (during manufacturing process tolerances up to ±1° are normal) and passes into the cable/conduit pass through region 62 through locking finger opening 42. The approximately 90 degree angle can be seen in FIGS. 9 and 11.

Figure 11:
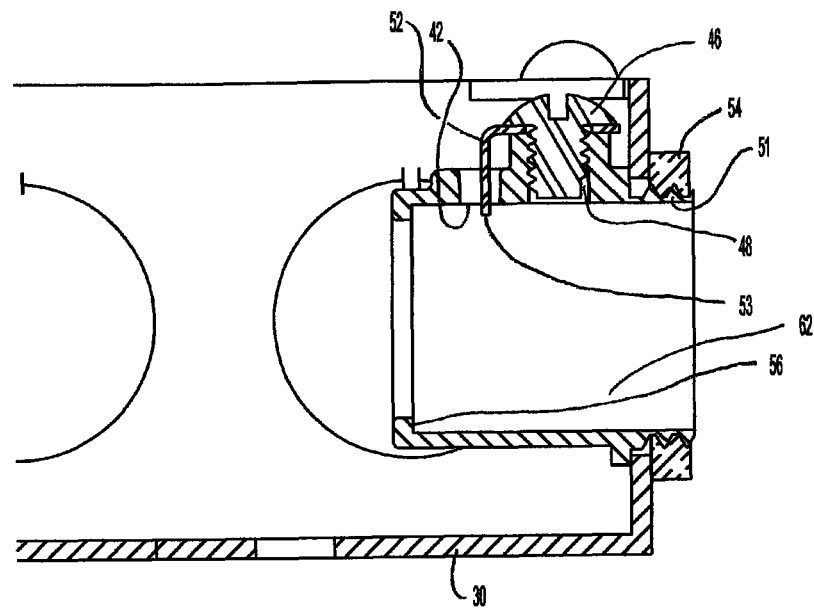
FIG. 11 is a side sectional view showing the junction/outlet box and locking insert system according to the second embodiment, before an electrical tubing/conduit is inserted into the pass through region of the insert.
Figure 12:
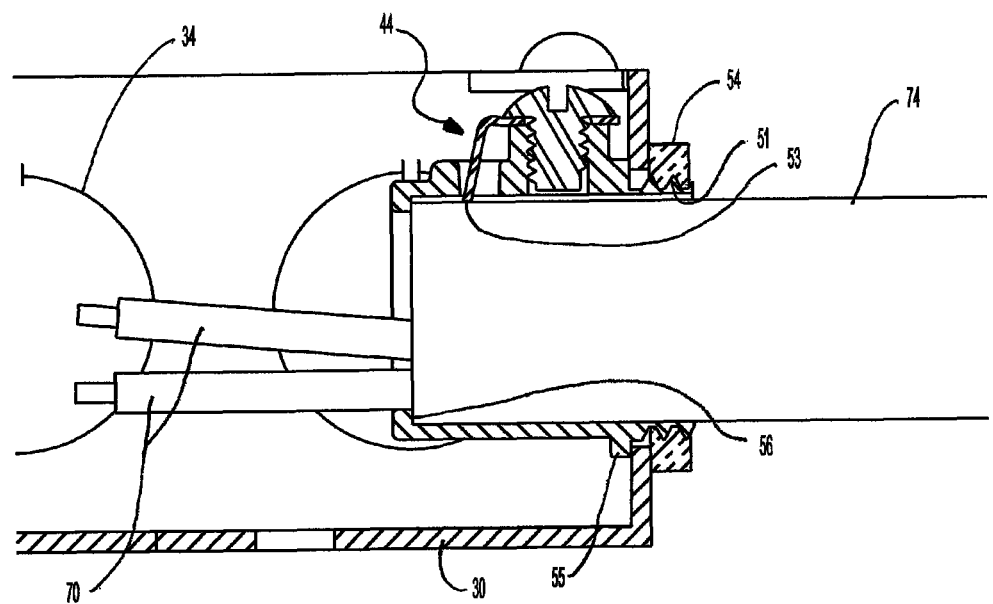
FIG. 12 is a side sectional view showing electrical tubing installed into the junction/outlet box and locking insert combination with the locking finger pressed upward and angled and applying constant tension on the electrical tubing/conduit.

When an electrical metallic tubing (EMT) or rigid conduit 74 is inserted into the electrical cable/conduit pass through region 62 it can be moved up to an end stop 56. The end stop 56 has a central opening sized to allow passage of the tubing/conduit 74 but the end stop 56 stops the tubing/conduit 74 from passing through opening. Before the tubing/conduit 74 is inserted into the cable/conduit pass through region 62, the locking finger 52 extends at a nominal 90° angle as shown in FIG. 11. In this position the locking finger edge 53 is in the path of the tubing/conduit 74. As the tubing/conduit 74 passes the locking finger 52, the locking finger edge 53 engages the outer surface of the tubing/conduit 74. With further advancement of the tubing/conduit 74, the locking finger 52 is disposed at an angle as shown in FIG. 12. The locking finger edge 53 on the locking finger 52 applies a steady pressure on the electrical metallic tubing (EMT) or rigid conduit 74 to retain the conduit 74 and prevent removal of the conduit 74 from the insert 50 and to provide the necessary bonding of conduit 74 to the locking insert 50.

The junction or junction/outlet box wall thickness 31, the mounting hole 32 and the knockout holes 34 are industry standard dimensions and locations as defined by National Electrical Manufacturers Association (NEMA). The cover screw 36 is provided for later use to attach a cover or to attach a device. The fastenerless junction/outlet box 40 does not require removal of a finished wall for connecting or inspecting the tubing/conduit 74.

Figure 8:
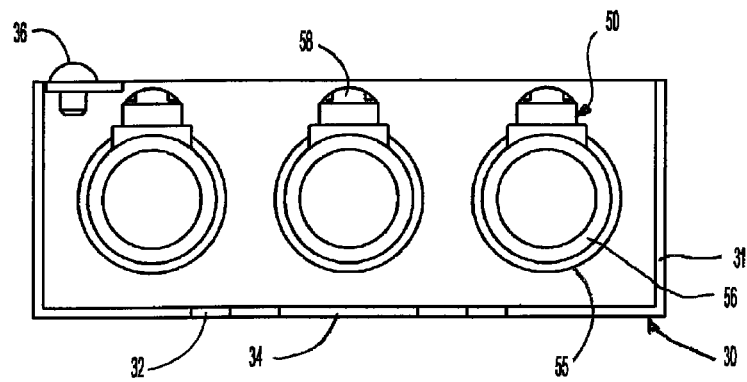
FIG. 8 is a sectional view of the junction/outlet box of FIG. 6 showing the retainer flanges that each form a stop that prevents removal of the locking insert.

Referring to FIG. 8, the retaining flange 55 prevents the locking insert 50 from passing through the box knockout hole 34 in the junction or junction/outlet box 30. Insert end stop 56 has an opening that is large enough to permit the passage of the electrical conductors 70 but the opening is smaller than the outside diameter of the conduit 74. This insert end stop 56 may have an insulator material coating to reduce the possibility of electrical shock or fire by preventing the metallic sheath from becoming energized by contact with live wiring. The locking insert 50 is positioned in junction/outlet box 30 to allow ample volume for wiring of electrical devices.

Figure 9:
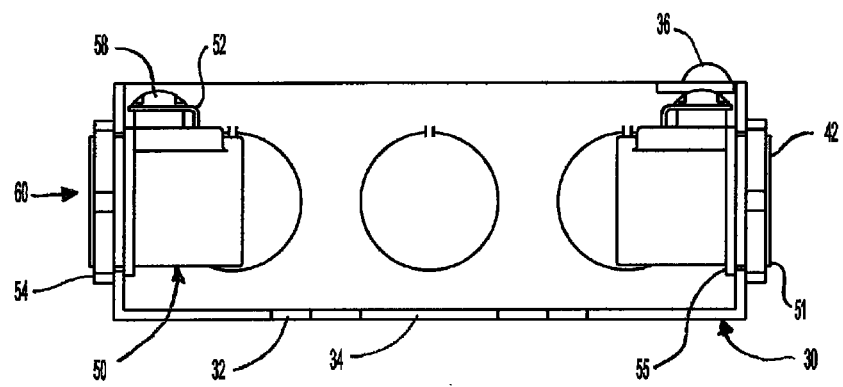
FIG. 9 is a side sectional view illustrating the junction/outlet box and locking insert system according to the second embodiment of the invention with a locking finger extending downwardly into an axially extending pass through region of the insert.
Figure 10:
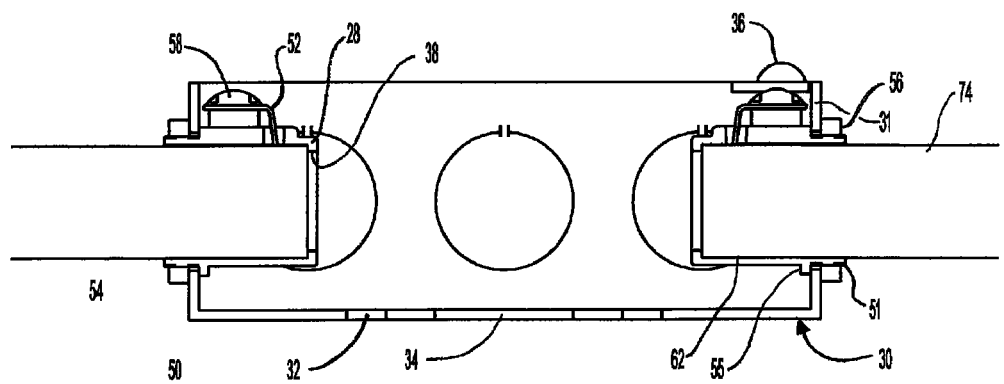
FIG. 10 is a side sectional view showing the junction/outlet box and locking insert system according to the second embodiment of the invention with a locking finger extending downwardly into an axially extending pass through region of the insert and being at an angle based on the locking finger bonding with electrical tubing/conduit.

Referring to FIGS. 9 and 10, the locking insert 50 is positioned in the junction/outlet box 30 to install the electrical conduit 74 by use of the locking finger 52. The locking finger 52 will flex outward over the conduit 74 until the conduit 74 is pushed as far as insert end stop 56. Upon the conduit 74 reaching the insert end stop 56, the locking finger 52 is caused to settle on the conduit/tubing 74 outside surface. FIG. 10 depicts the electrical conduit 74 installed in the fastenerless electrical junction/outlet box 40 through the locking insert 50 attached to the junction or junction/outlet box 30. The conduit 74 is correctly positioned in the insert 50 by limiting the insertion by use of the end stop 56 sized to allow passage of four electrical conductors 70 but for stopping conduit 74 from passing through the opening. The locking finger 52 applies tension to the conduit 74 and secures the conduit 74.

The fastenerless junction/outlet box system 10 is used to provide a method for quickly connecting a flexible electrical cable to a combination junction or junction/outlet box. The junctions/junction/outlet box 30 may be provided in advance with self-securing inserts 20 or 50. As an alternative, a standard junction or junction/outlet box 30 may be provided and the electrician may insert self-securing inserts 20 or 50 in the punch out of openings 32/34 of the junction or junction/outlet box 30.

In use, for attaching cable 72, the fastenerless junction/outlet box system 10 is deployed with junction/outlet box 30 and self-securing inserts 20. After attaching the outlet box 30 to a framing stud or wall, the contractor must remove a portion of the electrical cable metallic sheath of the cable 72 to expose significant length of conductors 70 to meet electrical code regulations. To install the cable 72 into the locking insert 20, conductors 70 are passed through the insert end stop terminal pass through opening 38. The electrical cable metallic sheath or armor of the cable 72 is next pushed into the insert opening 42, and into electrical cable/conduit pass through region 62 until the sheath/armor of the cable reaches the insert end stop 26. The cable 72 is now secured. The securing self-actuating (tool-less and fastenerless) and is based on a method for quickly securing manually inserted flexible electrical cable to an electrical junction/outlet box 30 without use of tools with insert 20 having a defined opening for receiving the cable 72 wherein the insert further comprises a flexible locking means with locking member/finger 22 for locking the flexible electrical cable 72 to the insert 20. This provides an electrical bonding and a self-actuating cable 72 to box 30 connection. This is based on a flexible locking means to biasingly contact and exert a resilient detent action upon the flexible conduit or cable.

For attaching conduit 74, the fastenerless junction/outlet box system 40 is deployed with junction/outlet box 30 and self-securing inserts 50. After attaching the outlet box to a framing stud or wall the contractor will simply push the Electrical Metallic Tubing of the conduit 74 into the electrical cable/conduit pass through region 62 of the locking insert 50 until the tubing reaches the locking insert end stop 56. The conduit 74 is now secured and wire conductor 70 can be pulled through the tubing and through terminal pass through opening 38 of the insert 50. The securing is self-actuating (tool-less and fastenerless) and based on the method for quickly connecting electrical conduit to the junction/outlet box 30.

While specific embodiments of the invention have been shown and described in detail to illustrate the application of the principles of the invention, it will be understood that the invention may be embodied otherwise without departing from such principles.

| APPENDIX List of References Characters ||
|---|---|
| 10 | fastenerless junction/outlet box system |
| 18 | locking finger arrangement |
| 20 | self-securing insert |
| 22 | locking finger |

APPENDIX
List of References Characters

| | |
|---|---|
| 23 | locking finger tab |
| 24 | retainer flange |
| 26 | insert stop |
| 28 | insulator |
| 30 | junction/outlet box |
| 32 | mounting hole |
| 34 | junction or junction/outlet box knockout hole |
| 36 | cover screw |
| 38 | central pass through opening |
| 40 | fastenerless junction/outlet box system |
| 42 | pass through opening |
| 44 | locking finger arrangement |
| 46 | locking finger retainer member |
| 48 | retainer receiving opening |
| 50 | self-securing insert |
| 51 | insert external projection |
| 52 | locking finger |
| 53 | locking finger tab |
| 54 | locking ring |
| 55 | retainer flange |
| 56 | end stop |
| 58 | fastener |
| 60 | cable insertion direction |
| 62 | electrical cable/conduit pass through region |
| 70 | electrical conductors |
| 72 | cable sheath |
| 74 | conduit |

What is claimed is:

1. A junction/outlet box locking insert comprising:
an insert body with an outer insert body surface and an inner axially extending pass through region having an open end and an electrical cable/conduit end stop with a central electrical conductor pass through opening, said outer insert body surface having a dimension smaller than a dimension of an opening of a sidewall of a plurality of sidewalls of a junction/outlet box when inserted into an opening of the junction/outlet box;
a retainer flange connected with said insert body at an axial end thereof;
an insert stop device cooperating with said retainer flange for fixing said insert body to the junction/outlet box; and
a flexible locking finger arrangement connected to said insert body and including a locking finger extending radially inwardly of said outer insert body surface, said locking finger being self-actuating whereby said locking finger has a rest state such that said locking finger is in a path of a conduit or a metallic sheath of an electrical cable being inserted into said opening and said locking finger engages the conduit or the metallic sheath of the electrical cable upon an end of the conduit or the metallic sheath of the electrical cable being inserted into said opening up to said electrical cable/conduit stop, said retainer flange and said insert stop device positioning said insert body relative to the junction/outlet box such that said locking finger engages the conduit or the metallic sheath of the electrical cable within the junction/outlet box.

2. A junction/outlet box locking insert according to claim 1, wherein said locking finger includes a locking tab extending radially inwardly and axially in a direction toward said stop to be at an angle relative to a cable insertion direction for allowing insertion of the electrical cable into said pass through region in an insertion axial direction and preventing removal of the conduit or the metallic sheath of the electrical cable from said pass through region in a removal axial direction based on a self-securing engagement of said locking tab with the conduit or the metallic sheath to act against removal.

3. A junction/outlet box locking insert according to claim 1, wherein:
said retainer flange is integral with said insert body and provided at the axial end thereof to prevent insertion of said insert body into the junction/outlet box beyond said retainer flange; and
said insert stop device comprises a flexible insert stop integral with said insert body and spaced axially from said retainer flange, said flexible insert stop extending radially outwardly from said outer insert body surface to provide an axial dimension that is greater than the dimension of the opening of the junction/outlet box in a relaxed state of said insert stop and being movable to a flexed state to provide a dimension, in cooperation with said outer insert body surface, that is the same as or smaller than the dimension of the opening of the junction/outlet box, said flexible insert stop including a ramp actuation surface that is acted on by the sidewall of the junction/outlet box adjacent to the opening to flex said flexible insert stop from the relaxed state to the flexed state as the locking insert is passed through the opening of the junction/outlet box and to spring radially outwardly to the relaxed state as the flexible insert stop passes through the opening of the junction/outlet box to retain the locking insert to the junction/outlet box with a portion of the sidewall of the junction/outlet box held between the flexible insert stop and the retainer flange.

4. A junction/outlet box locking insert according to claim 1, wherein the locking finger is formed integrally with said insert body and is joined to said insert body along a hinge edge and extends inwardly at an angle relative to a cable insertion direction from said hinge edge.

5. A junction/outlet box locking insert according to claim 1, wherein:
said retainer flange is connected with said insert body adjacent to the axial end thereof and said insert body has an external projection extending axially beyond said retainer flange; and
said insert stop device comprises a locking ring connected to said external projection on an outside of the junction/outlet box to retain the locking insert to the junction/outlet box with a portion of the sidewall of the junction/outlet box held between the locking ring and the retainer flange.

6. A junction/outlet box locking insert according to claim 1, wherein:
said locking finger arrangement includes a locking finger support and a fastener connected to said support wherein said locking finger is fixed to said insert body via said fastener.

7. A junction/outlet box locking insert according to claim 1, wherein said electrical cable/conduit stop comprises an insulator to insulate the cable/conduit in the pass through region.

8. A junction/outlet box system comprising:
a junction/outlet box with a plurality of sidewalls with knockout openings having an opening dimension;
an insert body with an outer insert body surface and an inner axially extending pass through region having an open end and an electrical cable/conduit end stop with a central electrical conductor pass through opening, said outer insert body surface having a dimension smaller than the opening dimension;
a retainer flange connected with said insert body at an axial end thereof;

an insert stop device cooperating with said retainer flange for fixing said insert body to the junction/outlet box; and a flexible locking finger arrangement connected to said insert body and including a locking finger extending radially inwardly of said outer insert body surface, said locking finger being self-actuating whereby said locking finger has a rest state such that said locking finger is in a path of a conduit or a metallic sheath of an electrical cable being inserted into said opening and said locking finger engages the conduit or the metallic sheath of the electrical cable upon an end of the conduit or the metallic sheath of the electrical cable being inserted into said opening up to said electrical cable/conduit stop, said retainer flange and said insert stop device positioning said insert body relative to the junction/outlet box such that said locking finger engages the conduit or the metallic sheath of the electrical cable within the junction/outlet box.

9. A junction/outlet box system locking insert according to claim 8, wherein said locking finger includes a locking tab extending radially inwardly and axially in a direction toward said stop to be at an angle relative to a cable insertion direction for allowing insertion of the electrical cable into said pass through region in an insertion axial direction and preventing removal of the conduit or the metallic sheath of the electrical cable from said pass through region in a removal axial direction based on a self-securing engagement of said locking tab with the conduit or the metallic sheath to act against removal.

10. A junction/outlet box system locking insert according to claim 8, wherein:
said retainer flange is integral with said insert body and provided at the axial end thereof to prevent insertion of said insert body into the junction/outlet box beyond said retainer flange; and
said insert stop device comprises a flexible insert stop integral with said insert body and spaced axially from said retainer flange, said flexible insert stop extending radially outwardly from said outer insert body surface to provide an axial dimension that is greater than the dimension of the opening of the junction/outlet box in a relaxed state of said insert stop and being movable to a flexed state to provide a dimension, in cooperation with said outer insert body surface, that is the same as or smaller than the dimension of the opening of the junction/outlet box, said flexible insert stop including a ramp actuation surface that is acted on by the sidewall of the junction/outlet box adjacent to the opening to flex said flexible insert stop from the relaxed state to the flexed state as the locking insert is passed through the opening of the junction/outlet box and to spring radially outwardly to the relaxed state as the flexible insert stop passes through the opening of the junction/outlet box to retain the locking insert to the junction/outlet box with a portion of the sidewall of the junction/outlet box held between the flexible insert stop and the retainer flange.

11. A junction/outlet box system locking insert according to claim 8, wherein the locking finger is formed integrally with said insert body and is joined to said insert body along a hinge edge and extends inwardly at an angle relative to a cable insertion direction from said hinge edge.

12. A junction/outlet box system locking insert according to claim 8, wherein:
said retainer flange is connected with said insert body adjacent to the axial end thereof and said insert body has an external projection extending axially beyond said retainer flange; and
said insert stop device comprises a locking ring connected to said external projection on an outside of the junction/outlet box to retain the locking insert to the junction/outlet box with a portion of the sidewall of the junction/outlet box held between the locking ring and the retainer flange.

13. A junction/outlet box system locking insert according to claim 8, wherein:
said locking finger arrangement includes a locking finger support and a fastener connected to said support wherein said locking finger is fixed to said insert body via said fastener.

14. A junction/outlet box system locking insert according to claim 8, wherein said electrical cable/conduit stop comprises an insulator to insulate the cable/conduit in the pass through region.

15. A method for securing electrical cable and/or conduit into an electrical box, the method comprising the steps of:
providing an electrical box having an opening;
providing an electrical cable with a conduit or a metallic sheath;
providing an insert body with an outer insert body surface and an inner axially extending pass through region having an open end and an electrical cable/conduit end stop with a central electrical conductor pass through opening, said outer insert body surface having a dimension smaller than a dimension of an opening of a sidewall of the electrical box when inserted into the opening of the electrical box;
providing a retainer flange connected with said insert body at an axial end thereof;
providing an insert stop;
providing a locking finger arrangement connected to said insert body and including a locking finger extending radially inwardly of said outer insert body surface;
inserting the insert body into the opening of the electrical box such that retainer flange contacts a surrounding wall of the opening;
fixing the insert body to the electrical box based on the insert stop device cooperating with said retainer flange to retain the locking insert to the electrical box with a portion of the sidewall of the electrical box held between the insert stop and the retainer flange;
inserting the electrical cable with the conduit or the metallic sheath through the pass through region open end and into the pass through region until the conduit or metal sheath reaches the electrical cable/conduit stop, said locking finger being self-actuating whereby the locking finger has a rest state such that said locking finger is in a path of a conduit or a metallic sheath of an electrical cable being inserted into said opening and said locking finger engages the conduit or the metallic sheath upon the conduit or the metallic sheath being inserted into said opening up to said electrical cable/conduit stop, said retainer flange and said insert stop device positioning said insert body relative to the electrical box such that said locking finger engages said conduit or said metallic sheath within the electrical box.

16. A method according to claim 15, wherein said locking finger extends radially inwardly and axially in a direction toward said electrical cable/conduit stop and is at an angle relative to a cable insertion direction for allowing insertion of the electrical cable into said pass through region in an insertion axial direction and preventing removal of the conduit or the metallic sheath of the electrical cable from said pass through region in a removal axial direction based on a self-securing engagement of said locking tab with the conduit or the metallic sheath to act against removal.

17. A method according to claim 15, wherein:
said retainer flange is formed integral with said insert body and is provided at the axial end thereof to prevent insertion of said insert body into the electrical box beyond said retainer flange; and said insert stop device comprises a flexible insert stop integral with said insert body and spaced axially from said retainer flange, said flexible insert stop extending radially outwardly from said outer insert body surface to provide an axial dimension that is greater than the dimension of the opening of the electrical box in a relaxed state of said insert stop and being movable to a flexed state to provide a dimension, in cooperation with said outer insert body surface, that is the same as or smaller than the dimension of the opening of the electrical box, said flexible insert stop including a ramp actuation surface that is acted on by the sidewall of the electrical box adjacent to the opening to flex said flexible insert stop from the relaxed state to the flexed state as the locking insert is passed through the opening of the electrical box and to spring radially outwardly to the relaxed state as the flexible insert stop passes through the opening of the electrical box to retain the locking insert to the electrical box with a portion of the sidewall of the electrical box held between the flexible insert stop and the retainer flange.

18. A method according to claim 15, wherein:
said retainer flange is formed integral with said insert body and is provided at the axial end thereof to prevent insertion of said insert body into the electrical box beyond said retainer flange and said insert body has an external projection extending axially beyond said retainer flange; and said insert stop device comprises a locking ring connected to said external projection on an outside of the electrical box to retain the locking insert to the electrical box with a portion of the sidewall of the electrical box held between the locking ring and the retainer flange.

19. A method according to claim 15, wherein:
said locking finger arrangement includes a locking finger support and a fastener connected to said support wherein said locking finger is fixed to said insert body via said fastener.

20. A method according to claim 15, wherein the electrical cable with the conduit or the metallic sheath has a central electrical conductor that passes through the central electrical conductor pass through opening as the electrical cable and/or conduit is moved to reach the electrical cable/conduit stop such that the central electrical conductor extends into the electrical box a distance beyond the electrical cable/conduit stop.

* * * * *